(12) United States Patent
Biehl

(10) Patent No.: US 10,207,811 B2
(45) Date of Patent: Feb. 19, 2019

(54) CARRIER SYSTEM FOR CARRYING OUT INTERCEPTION MANEUVERS OF A LOADBEARING PARAGLIDER AND METHOD FOR ADJUSTING THE TRAILING EDGE OF A LOADBEARING PARAGLIDER

(71) Applicant: Airbus Defence and Space GmbH, Ottobrunn (DE)

(72) Inventor: Jukka Biehl, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/966,997

(22) Filed: Dec. 11, 2015

(65) Prior Publication Data

US 2016/0176531 A1 Jun. 23, 2016

(30) Foreign Application Priority Data

Dec. 18, 2014 (DE) .................. 10 2014 018 702

(51) Int. Cl.
| | | |
|---|---|---|
| *B64D 17/22* | (2006.01) | |
| *B64D 17/02* | (2006.01) | |
| *B64D 17/34* | (2006.01) | |

(52) U.S. Cl.
CPC ........... *B64D 17/22* (2013.01); *B64D 17/025* (2013.01); *B64D 17/34* (2013.01)

(58) Field of Classification Search
CPC ...... B64D 17/025; B64D 17/22; B64D 17/30; B64D 17/34; B64D 17/38; B64D 17/386;

(Continued)

(56) References Cited

U.S. PATENT DOCUMENTS

| | | | | | |
|---|---|---|---|---|---|
| 4,729,530 A | * | 3/1988 | Jalbert | ................. | B64D 17/025 244/145 |
| 7,648,105 B2 | * | 1/2010 | Dunker | ................. | B64C 39/024 244/142 |

(Continued)

FOREIGN PATENT DOCUMENTS

| | | |
|---|---|---|
| DE | 19610052 A1 | 9/1997 |
| DE | 19634017 | 2/1998 |

(Continued)

OTHER PUBLICATIONS

Office Action and Search Report for corresponding European application No. 15 200 309.1, dated Feb. 23, 2017.

*Primary Examiner* — Richard R. Green
*Assistant Examiner* — Brady W Frazier
(74) *Attorney, Agent, or Firm* — Greer, Burns & Crain, Ltd.

(57) ABSTRACT

A carrier system for carrying out interception maneuvers of a loadbearing paraglider which has a glider having a trailing edge for carrying out the maneuver with at least one interception line is fixed to said edge includes at least one carried load unit, which is connected to the carrier system via a first, short load carrier belt and a second, longer load carrier belt. A carried load connected to the carried load unit is carried by way of the first, short load carrier belt. The trailing edge is adjusted to carry out the maneuver by the gravitational force of the carried load, in that the first, short load carrier belt is separated and the carried load is carried by way of the longer, second load carrier belt.

14 Claims, 5 Drawing Sheets

(58) Field of Classification Search
CPC ............ B64C 31/036; B64C 2201/107; B64C 2201/128
USPC ..... 244/142, 145, 151 A, 151 B, 151 R, 152
See application file for complete search history.

(56) References Cited

U.S. PATENT DOCUMENTS

| | | | |
|---|---|---|---|
| 2001/0004097 A1* | 6/2001 | Schwarzler ............ | B64D 17/34 244/142 |
| 2004/0000618 A1 | 1/2004 | Horst | |
| 2004/0169111 A1* | 9/2004 | Christof ................ | B64D 17/34 244/152 |
| 2007/0257155 A1* | 11/2007 | Sadeck .................... | B64D 1/14 244/142 |
| 2009/0026319 A1* | 1/2009 | Strong .................. | B64C 39/024 244/152 |
| 2010/0001140 A1* | 1/2010 | McHugh ................ | B64D 17/38 244/148 |

FOREIGN PATENT DOCUMENTS

| | | | | |
|---|---|---|---|---|
| DE | 19634017 A1 * | 2/1998 | ........... | B64D 17/025 |
| DE | 19960332 | 2/2001 | | |
| DE | 19960332 C1 | 2/2001 | | |
| DE | 10303788 | 11/2003 | | |
| DE | 10241585 | 3/2004 | | |
| EP | 1396426 A1 | 3/2004 | | |
| JP | 2008114763 A | 5/2008 | | |

\* cited by examiner

FIG 4
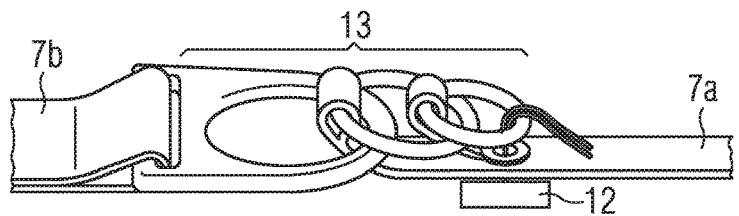
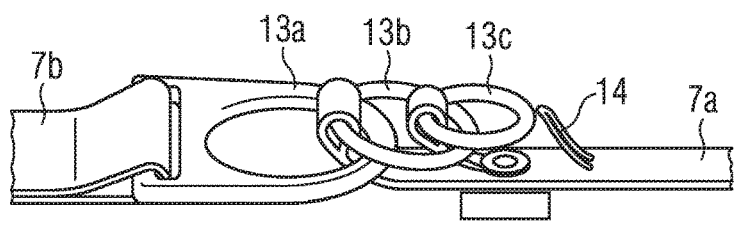
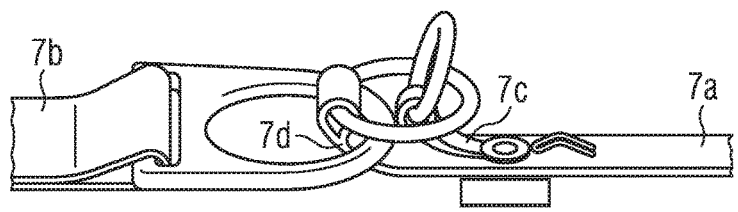
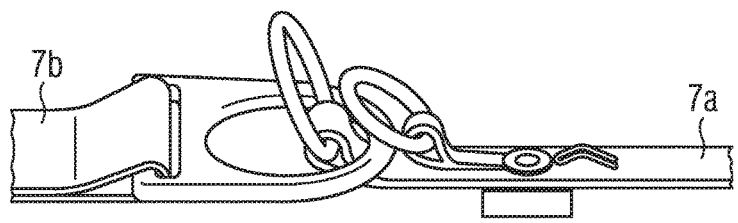
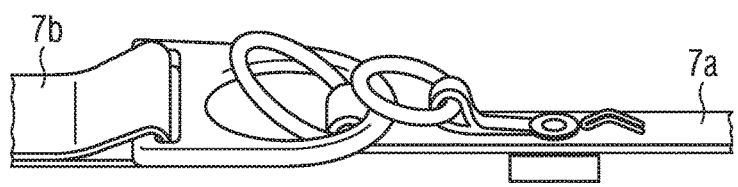
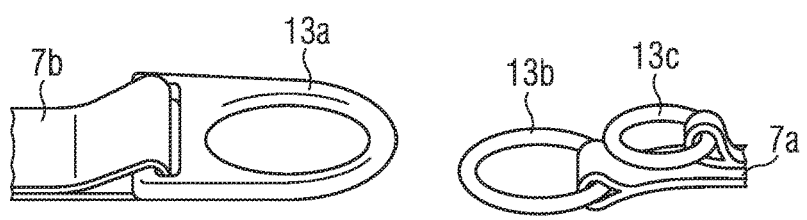

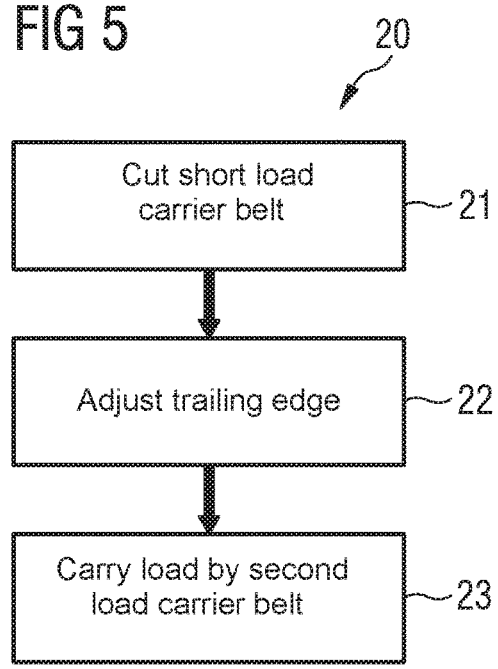

CARRIER SYSTEM FOR CARRYING OUT INTERCEPTION MANEUVERS OF A LOADBEARING PARAGLIDER AND METHOD FOR ADJUSTING THE TRAILING EDGE OF A LOADBEARING PARAGLIDER

CROSS-REFERENCES TO RELATED APPLICATIONS

This application claims the benefit of the German patent application No. 102014018702.0 filed on Dec. 18, 2014, the entire disclosures of which are incorporated herein by way of reference.

FILED OF THE INVENTION

Various embodiments relate in general to a carrier system for carrying out interception maneuvers of a loadbearing paraglider and to a method for adjusting the trailing edge of a loadbearing paraglider in order to carry out interception maneuvers.

BACKGROUND OF THE INVENTION

Carrier systems for carrying out interception maneuvers of a loadbearing paraglider are known for example from DE 102 41 585 or DE 199 60 332.

Loadbearing paragliders of this type may be provided for depositing loads for example from airplanes or for landing flying devices or aircraft which may be manned or unmanned. In paragliders which carry relatively heavy loads, for example, having a weight of several hundred kilograms to several tons, relatively large control forces and relatively long control paths occur in the actuators. The actuating drives provided in the art for controlling loadbearing paragliders of this type are control units having electric motors and rope winches, which are generally powered by a battery. A drawback of the actuating drive systems provided for this purpose is that they only apply a limited power and force for controlling the paraglider. A further drawback of the loadbearing paraglider comprising these control apparatuses or actuating drive apparatuses is that these devices make up a relatively large proportion of the total weight of the overall system consisting of the loadbearing paraglider and the control/actuating drive apparatus, such that the useful load which can be carried by the loadbearing paraglider is reduced or the loadbearing paraglider has to be formed having relatively large dimensions. Also, a further drawback of prior art loadbearing paragliders is that the control/actuating drive apparatuses used are relatively expensive. Therefore, this is disadvantageous in particular because the overall system is not and cannot be salvaged in military use. A further drawback of known loadbearing paraglider systems is that the energy store comprising the battery only has a limited capacity, meaning that gentle or safe landing without damaging the loads cannot be possible in many cases. During the landing approach, numerous actuations of the control/actuating drive apparatus are required in order to land the loads safely and accordingly require energy and, in the form of an additional weight, for example in the form of batteries, limit the available useful load.

SUMMARY OF THE INVENTION

From this starting point, one idea of the invention is to provide a carrier system for carrying out interception maneuvers of a loadbearing paraglider in which the interception maneuver takes place with as low an energy consumption as possible.

According to some embodiments of the invention, a carrier system for carrying out interception maneuvers of a loadbearing paraglider comprising a glider having a trailing edge for carrying out the maneuver is used, at least one interception line being fixed to said edge. The carrier system comprises at least one carried load unit, which is connected to the carrier system via a first, short load carrier belt and a second, longer load carrier belt. A carried load connected to the carried load unit is carried by way of the first, short load carrier belt. The trailing edge is adjusted to carry out the maneuver by the gravitational force of the carried load, in that the first, short load carrier belt is separated or cut and the carried load is carried by way of the longer, second load carrier belt.

The paraglider may, for example, be a planar paraglider or a comparable glider which comprises devices for carrying out an interception maneuver. The paraglider comprises an adjustable trailing edge or trailing edge flap, by means of which an interception maneuver or flare maneuver, also known as a flare for short, can be carried out. A flare refers to braking, which generates lift, during the landing of a planar paraglider or to landing braking. In a dynamic flare, the interception line or lines, also known as flare lines, leading to the trailing edge of the paraglider is/are retracted within a few tenths of a second. As a result of the profile of the paraglider or the wing being changed in this abrupt manner, the vertical and horizontal speed decrease considerably. In this context, part of the trailing edge is adjusted, one or more portions of the trailing edge on the right and left side of the trailing edge are preferably symmetrically adjusted, or else the entire trailing edge is adjusted. The power required for this maneuver is basically achieved by lowering the carried load or useful load fixed to the carrier system. In the present carrier system, two belt sets of different lengths are used, a first, short load carrier belt and a second, longer load carrier belt. When the flare is released, the first, shorter load carrier belt is separated, in other words the connection, which was previously provided by the first short load carrier belt, between the carrier system and the carried load unit is cut or disconnected, and the carried load is "dropped" until the load is intercepted by the second, longer load carrier belt. The interception line or lines or flare lines of the glider is/are fixed to a load carrier unit, to which the two load carrier belts from the carrier system are also fixed.

In one embodiment, separating the first, short load carrier belt increases the distance between the carrier system and the carried load unit to the length of the second, longer load carrier belt. As a result of separating the first load carrier belt, the interception line or flare line is "retracted," in other words a tensile force is exerted on the interception line by the carried load and provides the required adjustment at the trailing edge of the paraglider.

In one embodiment, the interception line extends over at least one deflector on the carried load unit. By way of a deflector on the carried load unit, the path length achieved by lowering the carrier load from the first load carrier belt onto the second, longer load carrier belt can be further increased. By way of a deflector on the carried load unit, the path length can, for example, be doubled when the interception line is fixed to the carrier system and guided over a deflector on the carried load unit.

In one embodiment, the interception line extends over at least one deflector on the carrier system. By way of a deflector on the carrier system, the path length achieved by lowering the carried load from the first load carrier belt onto the second, longer load carrier belt can be further increased. By combining one or more deflectors on the carrier system and one or more deflectors on the carried load unit, the length of the interception line or flare line, which is "retracted" by lowering the carried load onto the longer, second load carrier belt, can, for example, be increased several times over. A plurality of deflectors may provide a corresponding transmission in accordance with the principle of a pulley. The use of one or more deflectors is advantageous in particular when depositing heavy carried loads, since as a result the height of the freefall from cutting the first load carrier belt to carriage by way of the longer, second load carrier belt can be reduced, and the loads on the load carrier belts are thus reduced.

In one embodiment, the first, short load carrier belt is separated by means of a controlled separator device. To release the flare, it is advantageous for the first, short load carrier belt to be separated rapidly and reliably. Until the moment it is separated, the first, short load carrier belt carries the entire carried load and is thus subjected to a corresponding load. Once the desired height for carrying out the flare is reached, a controlled separator device separates or cuts the first load carrier belt, or for example parts of a multi-ring system connecting two portions or halves of the first load carrier belt, for example.

In one embodiment, the separator device is a cutter. The first load carrier belt, or, for example, parts of a multi-ring system connecting two portions or halves of the first load carrier belt, may be separated or cut for example by a cutter. A cutter is a pyrotechnic separator system. In a pipe or a corresponding cavity, a propelling charge is ignited and shoots a cutting or separating bolt against a stop or anvil. A belt or a wire, band, line or cable, positioned between said bolt and said stop or anvil is thus cut. Cutters of this type have a low maintenance outlay and are very reliable. Furthermore, cutters are known and are not described further herein.

In one embodiment, the first, short load carrier belt comprises a multi-ring separator system. To separate the first load carrier belt, the first load carrier belt comprises a multi-ring separator system. In this context, two parts of the first load carrier belt are connected by way of a multi-ring separator system. If the first load carrier belt is to be cut as desired, this can be provided for example by opening the multi-ring separator system. The multi-ring separator system comprises a plurality of mutually engaging rings, the rings being of different sizes. In this context, a small ring is passed through a large ring, an even smaller ring in turn passing through the smaller ring. Furthermore, multi-ring systems of this type are known and are not described further herein.

In one embodiment, the multi-ring separator system is a three-ring system. In a three-ring system, three rings are mutually engaged, it being possible to achieve transmission ratios of approximately 1:100 by way of the three mutually engaging rings, depending on the geometry. Thus, a force acts on the mounting of the smallest ring, which force is very small by comparison with that of the overall load carrier belt.

To open the multi-ring separator system or three-ring system, a holding cable, wire or similar device has to be removed, for example cut by an above-described separator device, for example a cutter, when the desired altitude is reached.

In one embodiment, the carrier system comprises at least one device for carrying out spiraling maneuvers. So as to maneuver the loadbearing paraglider to a desired landing position, the carrier system comprises a device by means of which the control lines of the paraglider can be influenced. This may, for example, be achieved by rolling up or unrolling the control lines connected to the paraglider. For determining the position, the carrier system may, for example, comprise a GPS position determination device.

In one embodiment, the carrier system comprises a height sensor for measuring the current altitude. To trigger the interception maneuver or release the flare at a particular height, the carrier system comprises a height sensor, which, for example, measures the height above the ground. Preferably, the height sensor measures the height of the underside of the carried load above the ground. The height measurement may, for example, be taken using a laser altimeter. The height of the underside of the carried load may, for example, be derived from the current height of the laser altimeter above the ground. To prevent interference from the carried load, the height measurement is taken, for example, at an angle deviating from the vertical by a few degrees, for example by between 10 and 45 degrees. When the desired target height is achieved, a signal is for example conveyed to the separator device in order to separate the first load carrier belt.

In one embodiment, the carrier system comprises one or more load carrier units, which are each connected to the carrier system via a short, first load carrier belt and at least via a second, longer load carrier belt. To carry out the interception maneuver, the first, short load carrier belts are cut substantially simultaneously. For this purpose, in one embodiment, each first load carrier belt may be provided with a separator device, the devices triggering simultaneously. In an alternative embodiment, it is also possible for only one, two or more of the first load carrier belts to be provided with a separator device, the devices triggering virtually simultaneously, the further load carrier belts being mechanically connected to these first load carrier belts having a separator device. When the separator devices are triggered, the further load carrier belts are preferably simultaneously separated. For example, the three-ring systems may be interconnected via cables such that the separation by the separator device makes it possible for the three-ring systems of the further load carrier belt to open virtually simultaneously. To adjust the trailing edge of the paraglider, the carrier system may comprise one or more interception lines or flare lines, which are each connected to a load carrier unit. In an embodiment comprising a plurality of load carrier units, the interception lines may, depending on the number thereof, be connected to one, two, a plurality of or all of the carried load units, it also being possible for a plurality of interception lines to be fixed to one or more carried load units by way of a cascade, for example. As a result of the first load carrier belts being separated, the plurality of interception lines are retracted virtually simultaneously so as to adjust the profile of the paraglider by adjusting the trailing edge of the paraglider.

According to some embodiments of the invention, a method for adjusting the trailing edge of a loadbearing paraglider for carrying out an interception maneuver is further used, which method uses at least one carried load unit, which is connected via a first, short load carrier belt and a second, longer load carrier belt to a carrier system of the loadbearing paraglider, and at least one interception line of the loadbearing paraglider being fixed to said system. The method comprises the following steps: separating the first, short load carrier belt; adjusting the trailing edge to carry out the maneuver using the gravitational force of the carried load; and carrying the carried load by way of the longer, second load carrier belt.

In one embodiment, separating the first, short load carrier belt increases the distance between the carrier system and the carried load unit to the length of the second, longer load carrier belt.

In one embodiment, the interception line extends over at least one deflector on the carried load unit. As a result of the interception line deflector, more interception line can be "retracted" when the carried load is lowered onto the second, longer load carrier belt.

In one embodiment, the interception line extends over at least one deflector on the carrier system. By combining a plurality of deflectors on the carrier system and the carried load unit, a corresponding transmission can be achieved in accordance with the principle of a pulley and more interception line can be retracted for a short falling distance.

In one embodiment, the first, short load carrier belt is separated by means of a controlled separator device. The separator device is preferably triggered when a desired target height is achieved and the paraglider is intended to be intercepted for landing.

Exemplary embodiments are set out in the dependent claims. It should be noted that the features of the embodiments of the devices also apply to embodiments of the method, and vice versa.

BRIEF DESCRIPTION OF THE DRAWINGS

In the drawings, the same reference numerals generally relate to the same parts throughout the different views. The drawings are not necessarily to scale; instead, the emphasis is generally on illustrating the principles of the invention. In the following description, different embodiments of the invention are described with reference to the following drawings, in which:

FIG. 4 shows the process of separating a three-ring system; and

FIG. 5 is a flow chart for carrying out an embodiment of the method for adjusting the trailing edge of a loadbearing paraglider.

DETAILED DESCRIPTION OF THE PREFERRED EMBODIMENTS

Figure 1:
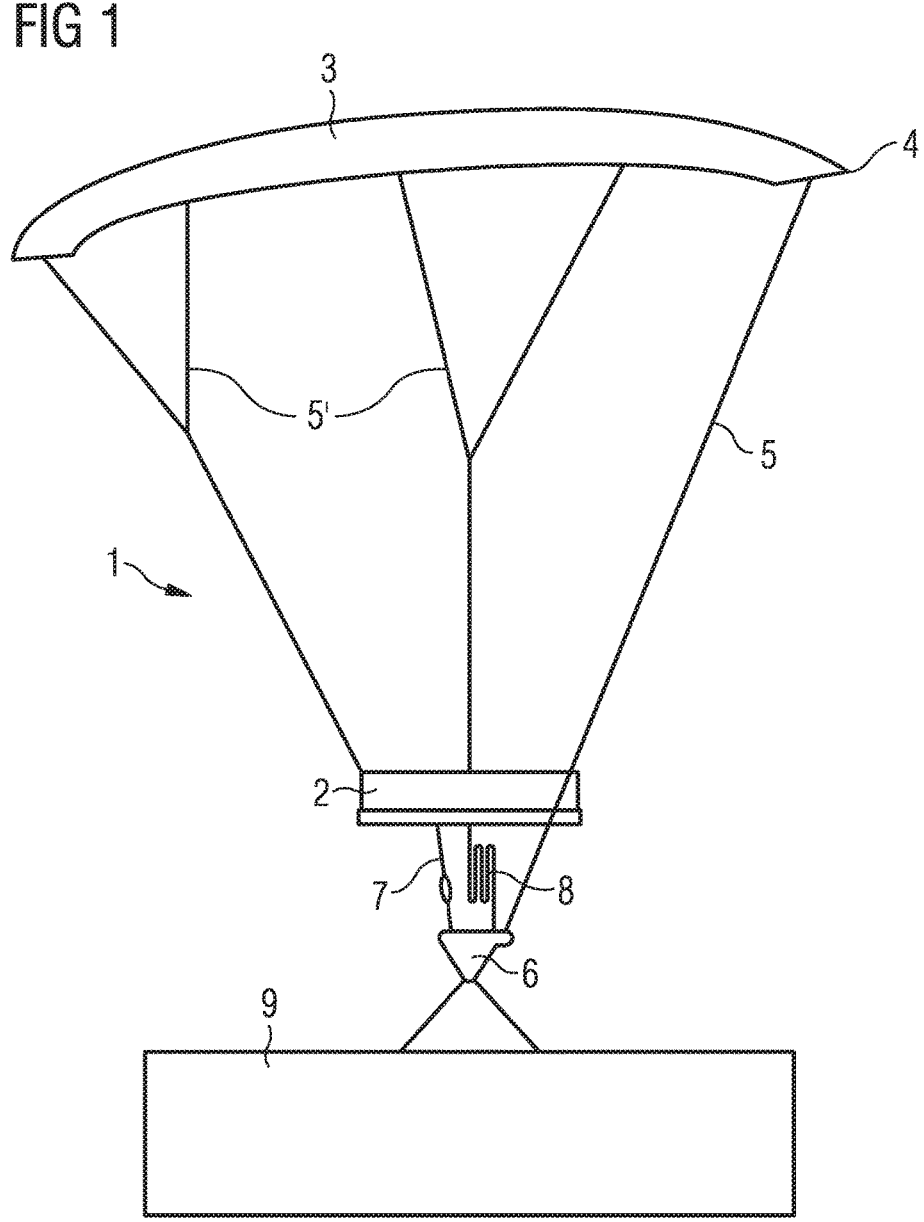
FIG. 1 shows a loadbearing paraglider comprising an embodiment of the carrier system.

The following detailed description refers to the accompanying drawings, which for illustrative purposes show specific details and embodiments in which the invention can be carried out.

The word "exemplary" is used herein with the meaning "serving as an example, instance or illustration." Any embodiment or configuration described herein as "exemplary" is not necessarily intended to be seen as preferred to or advantageous over other embodiments of configurations.

The following detailed description refers to the accompanying drawings, which form part of said description and which show, for illustrative purposes, specific embodiments in which the invention can be carried out. In this regard, directional terms such as "up," "down," "forward," "rearward," "front," "rear," etc., are used in reference to the orientation of the figure(s) being described. Since components of embodiments may be positioned in a number of different orientations, the directional terms are used for illustrative purposes and are in no way limiting. It goes without saying that other embodiments may be used and structural or logical changes may be made without departing from the scope of protection of the present invention. It goes without saying that the features of the various exemplary embodiments described herein can be combined, unless specifically stated otherwise. The following detailed description is therefore not to be seen as limiting, and the scope of protection of the present invention is defined by the accompanying claims.

In the context of the present description, the terms "connected," "attached" and "coupled" are used to describe both direct and indirect connection, direct or indirect attachment and direct or indirect coupling. In the drawings, identical or like elements are provided with identical reference numerals in so far as this is expedient.

FIG. 1 shows a loadbearing paraglider 1 comprising a carrier system 2 in accordance with one embodiment. The carrier system 2 is suspended from a paraglider 3 by way of further interception lines 5', which carry the actual load. In the embodiment shown, the paraglider 3 is a planar paraglider and comprises a trailing edge 4 or trailing edge flap, by means of which interception maneuvers or flare maneuvers can be carried out. A carried load 9 or useful load is fixed to the carrier system 2 via a carried load unit 6. The carried load 9 is fixed to the carried load unit 6 via belts or ropes or the like. The carried load unit 6 is connected via a first, short load carrier belt 7 and via a second, longer load carrier belt 8 to the carrier system 2. In the embodiment shown, the carried load 9 is carried by way of the carried load unit 6 and by way of the first, short load carrier belt 7. The entire weight of the carried load 9 and the carried load unit 6 is held by way of the first, short load carrier belt 7. The trailing edge 4 of the paraglider 3 is connected via an interception line 5 or flare line to the carried load unit 6. Alternatively, the trailing edge 4, in an embodiment which is not shown, may also be connected via preferably a plurality of interception lines to the carrier system 2, the flare line 5 proceeding from the carried load unit 6 being connected to these interception lines at one or more points, for example via a cascade. The trailing edge 4 of the paraglider 3 is adjusted by way of tension on the flare line 5 connected to the carried load unit 6, whereby the flare line 5 exerts tension on the interception lines which are connected to the trailing edge 4 of the paraglider 3.

To carry out an interception maneuver shortly before landing, the first, short load carrier belt 7 is cut or disconnected and the carried load 9 and the carried load unit 6 fall until they are caught by the second, longer load carrier belt 8. The carried load 9 and the carried load unit 6 are then suspended from the carrier system 2 by means of the second, longer load carrier belt 8. As a result of the increase in the distance between the carrier system 2 and the carried load unit 6, the gravitational force of the carried load 9 and the carried load unit 6 causes the interception line 5 or flare line to retract, causing the trailing edge 4 of the paraglider 3 to also be pulled downwards. The profile of the paraglider 2 is abruptly changed, causing the vertical and horizontal speed to decrease considerably. This makes gentle landing possible, meaning that the useful load or carried load 9 can be deposited gently and preferably without damage.

Figure 2:
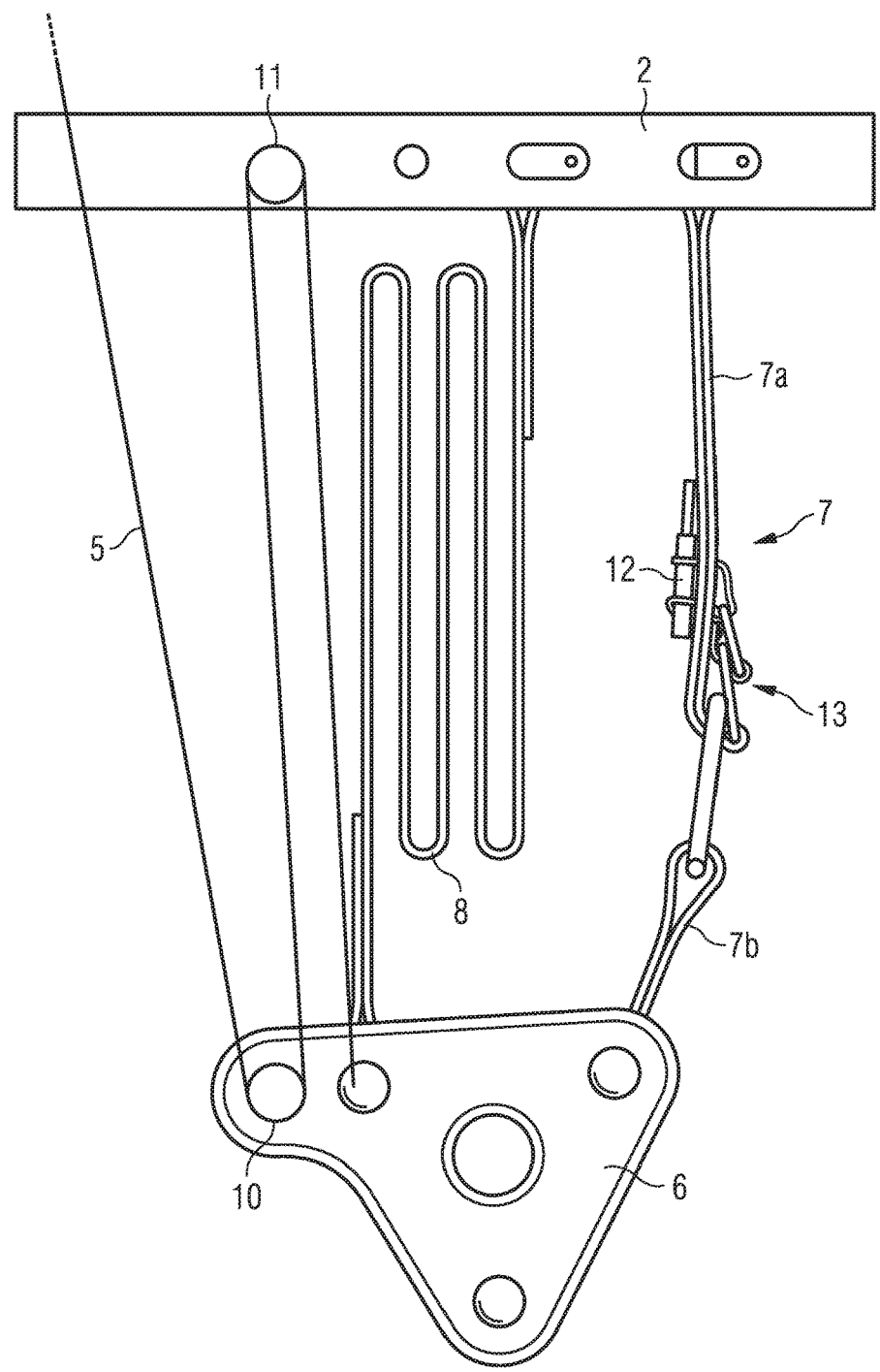
FIG. 2 is a detail of an embodiment of the carrier system.

FIG. 2 is a detail of an embodiment of the carrier system 2. A carried load unit 6 is connected via a first load carrier belt 7 and a second load carrier belt 8 to the carrier system 2. In the shown state of the embodiment of the carrier system 2, the first, short load carrier belt 7 comprises two portions 7a and 7b, which are interconnected via a three-ring system 13. To open the three-ring system 13, a separator device 12 is provided. If the paraglider reaches a particular target height above the ground, a signal is sent to the separator device 12 and the separator device 12 releases the three-ring system 13 such that the two portions 7a and 7b of the first load carrier belt 7 can be separated. Opening the three-ring system 13 is shown and described in detail in FIG. 4. Alternatively, the first load carrier belt 7 can be separated at virtually any desired location. For example, it may also be separated directly at a point where it is fixed to the carrier system 2 or the load carrier unit 6.

The carried load unit 6 is further connected via a second, longer load carrier belt 8 to the carrier system 2. If the first load carrier belt 7 is separated by the separator device 12, the carried load unit 6, along with a carried load (not shown) connected thereto, is suspended on the second, longer load carrier belt 8. The distance between the carried load unit 6 and the carrier system 2 is increased to the length of the second load carrier belt 8.

An interception line 5 or flare line is fixed to the carried load unit 6. In the embodiment shown of the carrier system 2, the interception line 5 extends from the carried load unit 6, via a first deflector 11 on the carrier system 2 and via a second deflector 10 on the carried load unit 6, and onwards to the trailing edge of the paraglider (not shown).

As a result of increasing the distance between the carried load unit 6 and the carrier system 2 to the length of the second load carrier belt 8, the interception line is simultaneously "retracted" such that tension acts on the trailing edge of the paraglider. Since the distance is very rapidly increased to the length of the second load carrier belt 8 when the first load carrier belt 7 is separated or cut, the interception line 5 or flare line leading to the trailing edge of the paraglider is retracted within a few tenths of a second shortly before landing. As a result of the profile of the paraglider being changed in this abrupt manner, the vertical and horizontal speed decrease considerably.

As a result of the deflectors 10 and 11, the retracted length of the interception line 5 is increased several times over. For example, in the embodiment shown comprising two deflectors 10 and 11, the retracted length is tripled in accordance with the principle of a pulley. To achieve a greater increase in the retracted length, further deflectors may be provided (not shown) on the carrier system 2 and/or the carried load unit 6.

Figure 3:
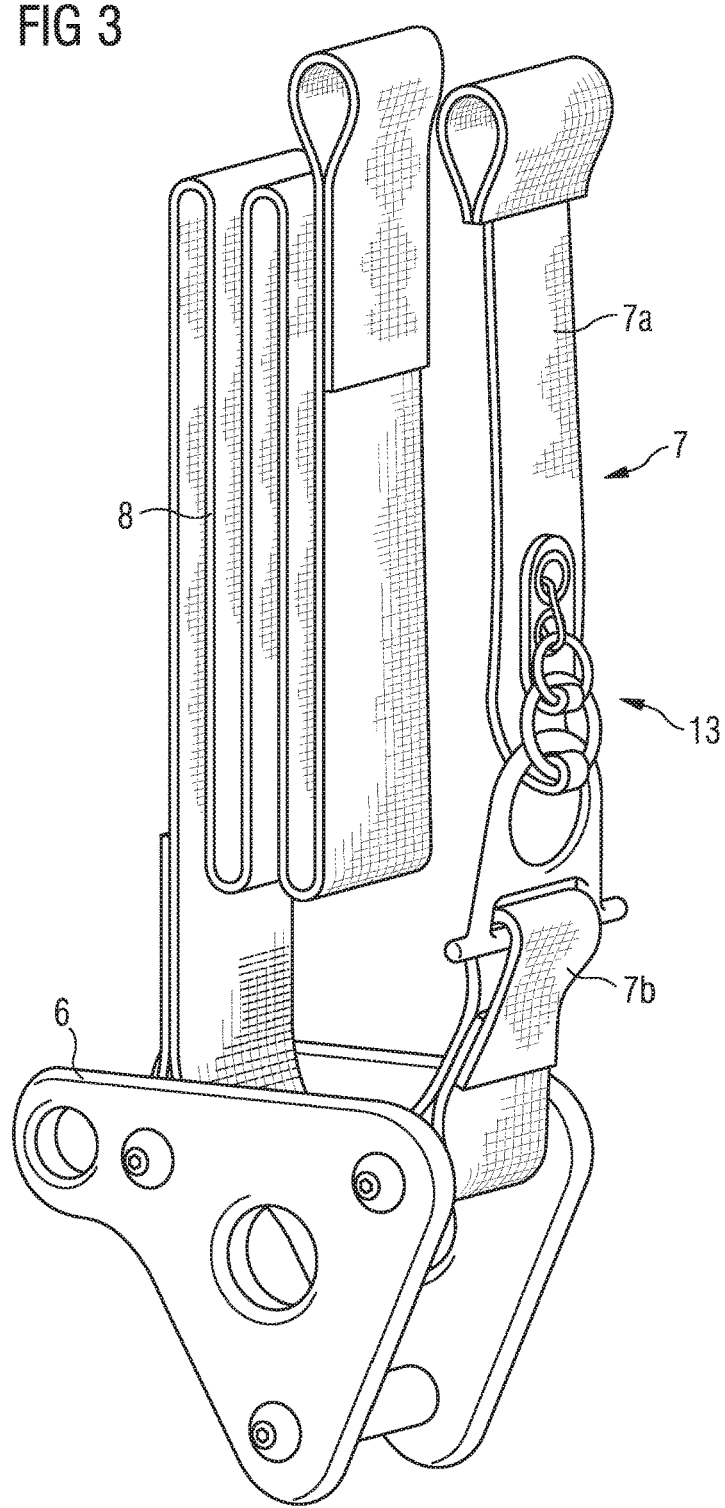
FIG. 3 is a detail of a further embodiment of the carrier system.

FIG. 3 is a detail of a further embodiment of the carrier system 2. In the 3D embodiment shown, in particular the arrangement of the first load carrier belt 7 and the second load carrier belt 8 on the carried load unit 6 can be seen. The first load carrier belt 7 is subdivided into two portions 7a and 7b, which are interconnected via a three-ring system 13. To separate the two portions 7a and 7b of the first load carrier belt 7, the three-ring system 13 is opened and the two portions 7a and 7b of the first load carrier belt 7 can be separated from one another. The carried load (not shown), which is fixed to the carried load unit 6, is connected to the carrier system and the paraglider (not shown) by the first load carrier belt 7, up until this is separated. The entire load is carried by way of the first load carrier belt 7. To release the flare, the first, short load carrier belt 7 has to be separated rapidly and reliably. The first load carrier belt 7 carries the useful load at the moment of release and is subject to a corresponding load.

After the first load carrier belt 7 is cut or separated, the carried load unit 6 "falls," together with the carried load, in freefall until it is intercepted by the second load carrier belt 8. Subsequently, the carried load unit 6 and the carried load are suspended from the carrier system via the second load carrier belt 8.

FIG. 4 shows the process of separating a three-ring system 13. The various views of FIG. 4 show various stages in the separation of the three-ring system 13.

The three-ring system 13 comprises three rings 13a, 13b, 13c which are combined with one another and are different sizes. The sizes of the rings 13a, 13b, 13c are selected in such a way that each ring, for example the ring 13b, can be passed through a further ring 13a. The ring 13c thus fits through the ring 13b. The ring 13a is connected to a first end 7b of the load carrier belt 7. The two rings 13b and 13c are each connected via belt portions 7c and 7d to a second end 7a of the load carrier belt 7. The smallest ring 13c is secured to a line 14, a band, a cable or a pin or the like.

To open the three-ring system 13, the line 14 is cut or released by means of a separator device 12 in such a way that, due to the gravitational force acting on the load carrier belt 7, the smallest ring 13 can be passed through the somewhat larger ring 13b. The smallest ring 13c is passed through the larger ring 13b via a belt portion 7c of the load carrier belt 7a. The belt portion 7c secures the second ring 13b against slipping out of the largest ring 13c. The largest ring 13a is secured by way of the belt portion 7d to which the second ring 13b is fixed. As a result of the smallest ring 13c being released, said ring slips through the second ring 13b, making it possible for the second ring 13b to slip through the largest ring 13a, and the first load carrier belt portion 7a is separated from the second load carrier belt portion 7b.

A separator device 12 is provided for separating the holding line 14 or a band, a cable, a wire, a pin or the like. When a particular target height is reached, this receives a signal and cuts the line 14 securing the three-ring system 13. A cutter, for example, may be used as a separator device 12. A cutter is a pyrotechnic separator device. In one embodiment, for example, in a pipe, a propelling charge is electrically ignited by a signal from the carrier system. The propelling charge shoots a cutting bolt against an anvil or a comparable counter piece, and thus cuts the cable or wire (not shown) arranged between the bolt and anvil or counter piece.

FIG. 5 is a flow chart 20 for carrying out an embodiment of the method for adjusting the trailing edge of a loadbearing paraglider. In a first step 21, the first, short load carrier belt is cut. In a further step 22, the trailing edge is adjusted for carrying out the maneuver under the gravitational force of the carried load. In step 23, the carried load is carried by way of the longer, second load carrier belt.

In this context, separating the first, short load carrier belt increases the distance between the carrier system and the carried load unit to the length of the second, longer load carrier belt. In one embodiment, the interception line extends over at least one deflector on the carried load unit. In a further embodiment, the interception line extends over at least one deflector on the carrier system. In one embodiment, the first, short load carrier belt is separated by means of a controlled separator device.

An object of the above-described carrier system is to implement the tensile force, to be applied for the tension on the trailing edge of the paraglider, by way of the load force of the carried load suspended from the paraglider for carrying out an interception maneuver, the carrier system according to the invention being connected to the carrier load via two belts. A short belt carries the carried load during the period of the descent. For carrying out the interception maneuver, the first belt is cut or disconnected and the carried load is carried by way of a longer belt. As a result of the increase in the distance between the carrier system and the carried load, a tensile force is simultaneously exerted on the trailing edge of the paraglider via a flare line so as to intercept the paraglider for gentle landing.

Although the invention has been shown and described primarily with reference to particular embodiments, it should be appreciated by those familiar with the technical field that numerous changes can be made to the configuration and details without departing from the essence and scope of the invention as defined by the accompanying claims. The scope of the invention is thus defined by the accompanying claims, and any changes falling within the literal meaning or scope of equivalence of the claims are therefore intended to be included.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A loadbearing paraglider, comprising:
   a glider having a trailing edge for carrying out a manoeuvre;
   a carrier system connected to the glider by a plurality of lines;
   at least one carried load unit connected to the carrier system via a first, short load carrier belt and a second, longer load carrier belt;
   a carried load connected to the carried load unit;
   wherein the carried load unit is carried by way of the first, short load carrier belt, wherein at least one interception line is fixed to the at least one carried load unit and the trailing edge; and
   wherein the trailing edge is adjusted to carry out the maneuver by the gravitational force of the carried load, in that the first, short load carrier belt is separated so as to no longer connect the carried load unit to the carrier system and the carried load unit is subsequently carried by way of the longer, second load carrier belt and the interception line.

2. The loadbearing paraglider according to claim 1, wherein separating the first, short load carrier belt increases a distance between the carrier system and the carried load unit to a length of the second, longer load carrier belt.

3. The loadbearing paraglider according to claim 1, wherein the first, short load carrier belt is separated via a controlled separator device.

4. The loadbearing paraglider according to claim 3, wherein the separator device is a cutter.

5. The loadbearing paraglider according to claim 1, wherein the first, short load carrier belt comprises a multi-ring separator system.

6. The loadbearing paraglider according to claim 5, wherein the multi-ring separator system is a three-ring system.

7. The loadbearing paraglider according to claim 1, comprising a height sensor for measuring the current altitude.

8. The loadbearing paraglider according to claim 1, wherein the at least one interception line extends over at least one deflector on the carried load unit.

9. The loadbearing paraglider according to claim 1, wherein the at least one interception line extends over at least one deflector on the carrier system.

10. A method for adjusting a trailing edge of a loadbearing paraglider for carrying out an interception maneuver, using at least one carried load unit connected via a first, short load carrier belt and a second, longer load carrier belt to a carrier system of the loadbearing paraglider, and wherein at least one interception line of the loadbearing paraglider is fixed to the at least one carried load unit and the trailing edge, the method comprising:
   separating the first, short load carrier belt so as to no longer connect the at least one carried load unit to the carrier system;
   adjusting the trailing edge to carry out the maneuver using the gravitational force of the carried load; and
   carrying the carried load unit by way of the longer, second load carrier belt and the interception line.

11. The method according to claim 10, wherein separating the first, short load carrier belt increases the distance between the carrier system and the carried load unit to the length of the second, longer load carrier belt.

12. The method according to claim 10, wherein the first, short load carrier belt is separated by means of a controlled separator device.

13. The method according to claim 10, wherein the interception line extends over at least one deflector on the carried load unit.

14. The method according to claim 10, wherein the interception line extends over at least one deflector on the carrier system.

* * * * *